(12) United States Patent
Dunsky

(10) Patent No.: US 8,473,126 B2
(45) Date of Patent: Jun. 25, 2013

(54) SURFACE MANAGEMENT AT AN AIRPORT

(75) Inventor: Ron Dunsky, Brooklyn, NY (US)

(73) Assignee: PASSUR Aerospace, Inc., Stamford, CT (US)

( * ) Notice: Subject to any disclaimer, the term of this patent is extended or adjusted under 35 U.S.C. 154(b) by 80 days.

(21) Appl. No.: 12/509,884

(22) Filed: Jul. 27, 2009

(65) Prior Publication Data

US 2010/0036596 A1     Feb. 11, 2010

Related U.S. Application Data

(60) Provisional application No. 61/084,105, filed on Jul. 28, 2008.

(51) Int. Cl.
*G06F 19/00*     (2011.01)

(52) U.S. Cl.
USPC ................................. 701/12; 701/3; 340/945

(58) Field of Classification Search
USPC .............. 701/3, 9, 15, 16, 117, 120; 340/945, 340/951
See application file for complete search history.

(56) References Cited

U.S. PATENT DOCUMENTS

| | | | |
|---|---|---|---|
| 5,375,058 A * | 12/1994 | Bass | 701/120 |
| 5,714,948 A * | 2/1998 | Farmakis et al. | 340/961 |
| 6,278,965 B1 * | 8/2001 | Glass et al. | 703/22 |
| 6,282,488 B1 * | 8/2001 | Castor et al. | 701/120 |
| 6,920,390 B2 * | 7/2005 | Mallet et al. | 701/120 |
| 7,333,887 B2 * | 2/2008 | Baiada et al. | 701/120 |
| 7,499,771 B2 * | 3/2009 | Caillaud | 701/3 |
| 7,702,427 B1 * | 4/2010 | Sridhar et al. | 701/4 |
| 7,725,410 B2 * | 5/2010 | Lee | 706/14 |
| 7,890,248 B2 * | 2/2011 | Poe et al. | 701/120 |
| 2002/0077743 A1 * | 6/2002 | Schmidt | 701/120 |
| 2002/0109625 A1 * | 8/2002 | Gouvary | 342/29 |
| 2002/0138194 A1 * | 9/2002 | Flynn et al. | 701/120 |
| 2003/0009278 A1 * | 1/2003 | Mallet et al. | 701/120 |
| 2003/0050746 A1 * | 3/2003 | Baiada et al. | 701/3 |
| 2003/0105579 A1 * | 6/2003 | Walter | 701/120 |
| 2003/0139875 A1 * | 7/2003 | Baiada et al. | 701/120 |
| 2003/0195693 A1 * | 10/2003 | Flynn et al. | 701/120 |
| 2005/0071076 A1 * | 3/2005 | Baiada et al. | 701/120 |
| 2005/0261814 A1 * | 11/2005 | Ryan et al. | 701/16 |
| 2007/0156635 A1 * | 7/2007 | Tatton et al. | 707/1 |
| 2007/0198170 A1 * | 8/2007 | Barry et al. | 701/120 |
| 2008/0010005 A1 * | 1/2008 | Small et al. | 701/120 |

* cited by examiner

*Primary Examiner* — Helal A Algahaim
(74) *Attorney, Agent, or Firm* — Fay Kaplun & Marcin, LLP

(57) ABSTRACT

An airport management system having a memory storing surface management data for aircraft at an airport and a processor calculating a metric using the surface management data and generating a recommendation for the aircraft based on the calculated metric. A computer readable storage medium including a set of instructions executable by a processor, the set of instructions operable to receive surface management data for aircraft at an airport, calculate a metric using the surface management data and generate a recommendation for the aircraft based on the calculated metric.

14 Claims, 2 Drawing Sheets

SURFACE MANAGEMENT AT AN AIRPORT

PRIORITY CLAIM/INCORPORATION BY REFERENCE

The present application claims priority to U.S. Provisional Patent Application 61/084,105 filed on Jul. 28, 2008, entitled "Surface Management at An Airport" naming Ron Dunsky as inventor, and hereby incorporates, by reference, the entire subject matter of the Provisional Application.

BACKGROUND

An airport monitoring system may enable an airport to provide a variety of information. Among the information includes data related to surface management such as locations and actual departure times for aircrafts. The surface management data may enable an airport manager to determine a departure sequence. Surface management has become critical to airline cost-control, in particular with fuel burn and greater service reliability for passengers. When the departure sequence is properly generated, surface management becomes part of a larger air traffic management solution which impacts some of an airline's most expensive daily operational decisions. However, if the departure sequence is not properly generated, stranding of aircrafts and higher fuel burn as well as passenger dissatisfaction increase. Conventional airport monitoring systems including surface management components enable a user to view all relevant data to monitor surface management of an airport. Despite the data being available, unforeseen circumstances, random errors, missed scheduling issues, etc. may cause an inefficient departure sequence from being generated. Furthermore, because conventional airport monitoring systems merely display the data, a user is prone to skip over an alert which may affect a departure schedule.

SUMMARY OF THE INVENTION

An airport management system having a memory storing surface management data for aircraft at an airport and a processor calculating a metric using the surface management data and generating a recommendation for the aircraft based on the calculated metric.

A computer readable storage medium including a set of instructions executable by a processor. The set of instructions operable to receive surface management data for aircraft at an airport, calculate a metric using the surface management data and generate a recommendation for the aircraft based on the calculated metric.

DETAILED DESCRIPTION

Figure 1:
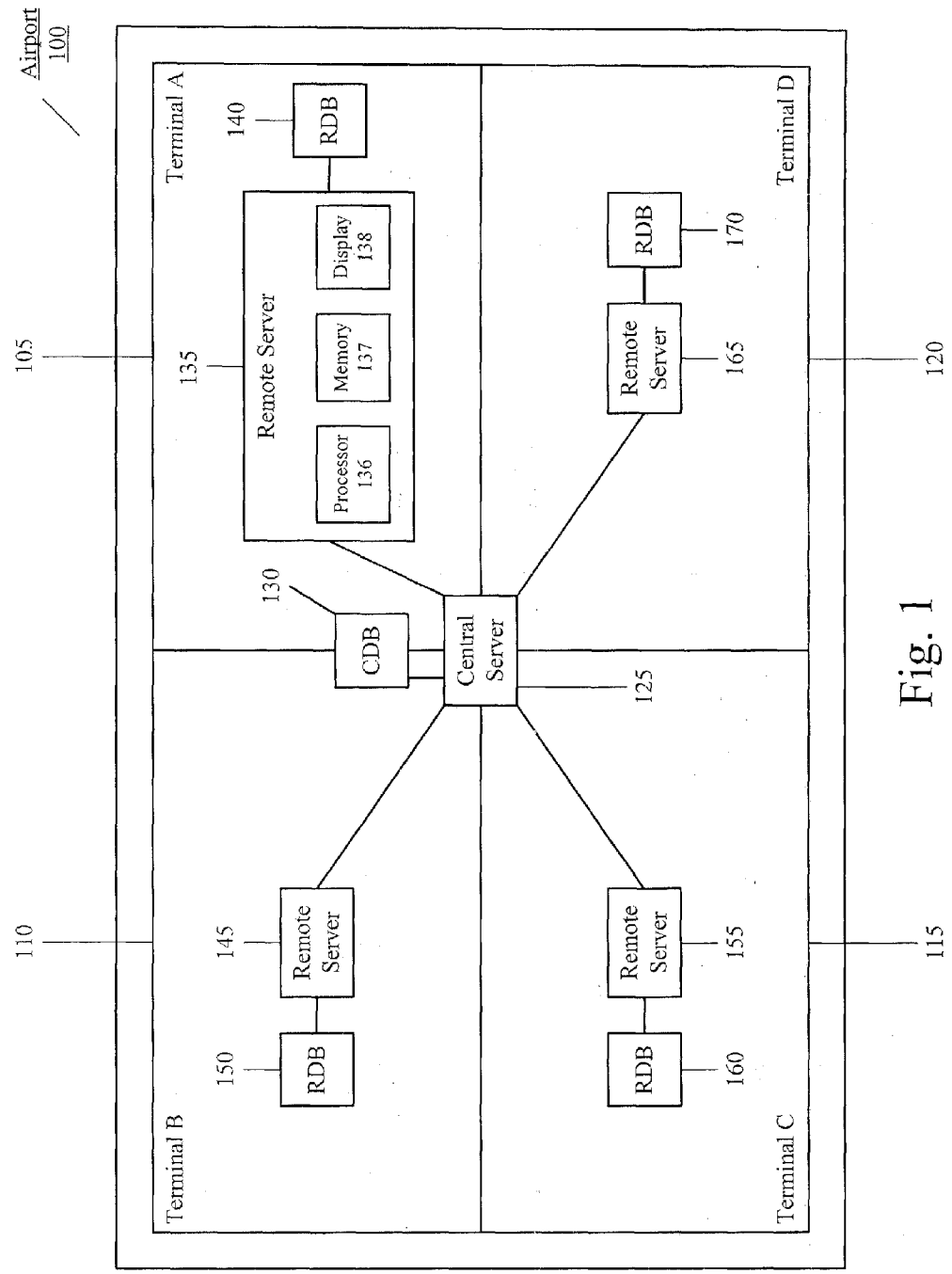
FIG. 1 shows an airport that utilizes an airport monitoring system according to an exemplary embodiment of the present invention.

The exemplary embodiments of the present invention may be further understood with reference to the following description and the appended drawings, wherein like elements are referred to with the same reference numerals. The exemplary embodiments of the present invention describe an airport monitoring system to generate data in which surface management at an airport realizes a maximized efficiency given the conditions at the time. For example, a most efficient departure schedule may be generated by monitoring surface management at an airport. The airport monitoring system is also configured to highlight particular data for a user which may affect surface management. The airport monitoring system, the departure schedule, and the surface management will be discussed in further detail below.

FIG. 1 shows an airport 100 that utilizes an airport monitoring system according to an exemplary embodiment of the present invention. In particular, the airport monitoring system may be configured to specifically monitor surface management. The airport 100 may be divided into a plurality of terminals. Specifically, the airport 100 may include a first terminal 105, a second terminal 110, a third terminal 115, and a fourth terminal 120. The surface management system may be centralized via a central server 125. Each terminal may also include a remote terminal. Thus, the first terminal 105 may include a first remote server 135; the second terminal 110 may include a second remote server 145; the third terminal 115 may include a third remote server 155; and the fourth terminal 120 may include a fourth remote server 165. Each server may include a respective database to store data related to surface management. Thus, the central server 125 may be connected to a central database 130; the first remote server 135 may be connected to a first remote database 140; the second remote server 145 may be connected to a second remote database 150; the third remote server 155 may be connected to a third remote database 160; and the fourth remote server 165 may be connected to a fourth remote database 170. The first remote server 135 may include constituent elements appropriate to its function. These may include a processor 136 for executing programs, a memory 137 for storing data executed by processor 136, and a display 138 for displaying the results of the execution of programs to a user. Those of skill in the art will understand that the central server 125 and the remote servers 145, 155 and 165 may also include similar constituent elements, which are omitted from FIG. 1 for readability of the figure.

It should be noted that the airport monitoring system may be embodied in a processor that executes a program stored therein such as the central server 125. Thus, in an exemplary embodiment, the airport monitoring system may be run on the central server 125 of a network. In particular, the network may be for the airport 100. In another example, the network may be a private network for access by airline carriers and airport managers. The airport management system may also be a module which is associated with the server of the network. That is, the module may be a self-contained processing unit that is used in association with an already existing system. It should be noted that the exemplary embodiments described above in which the airport monitoring system being used on or with a server of a network is only exemplary. In other embodiments, the airport monitoring system may be a stand alone computing unit that acts independently of an airport network but receives data relating to surface management of the airport 100.

It should be noted that the exemplary airport monitoring system may receive data from a variety of sources. For example, the particular airport may have installed the FAA ASDE-X system that provides surface data on aircraft that are on runways and taxiways. In addition, the airport monitoring system may receive information from passive radar systems that are installed on the airport site. Other sources of information may include commercially available gate feeds that indicate when aircraft have blocked-out (pushed away from a gate) or blocked-in (arrived at a gate).

The airport monitoring system may be configured to provide effective decision support that alters organizational behavior and business practices of an airport. As a result, significant cost savings from reduced fuel burn, higher traffic throughput and schedule completion with fewer overall delayed operational minutes may be realized. Additionally, passenger disruptions such as aircraft "holdouts" may be reduced which also contributes to an overall greater operational efficiency and airline reliability.

In order to achieve the above, the airport monitoring system according to the exemplary embodiments of the present invention may generate departure schedules by sequencing departures with known data relating to surface management. The airport monitoring system may be configured to understand visual locations of aircraft in queues, especially during congested/ground-delayed departure banks. Related information such as status of departure fixes, average block-out to off times, runway configuration and departure queues by fix may also be used by the airport monitoring system. The surface management data and the above listed data assist in filing for the most optimal departure schedule to be generated that includes coded departure routes for the aircraft. The coded departure routes may sequence push-backs and streams into active taxiways and prioritize requests for departure from air traffic control for aircraft already in the queue during extended delays.

The airport monitoring system may also be used for aircraft that may be have been stranded, inadvertently removed, or never placed in the queue for the departure schedule. According to an exemplary embodiment of the present invention, the airport monitoring system may be equipped to determine stranded aircraft as well as their location and support decisions to rectify the aircraft from being grounded. The airport monitoring system may assist airline personnel to visually locate aircraft remaining on the ground and provide related data so that an operationally sound, customer-friendly decision may be generated about the stranded passengers aboard the stranded aircraft.

It should be noted that the airport monitoring system may be used by the airport as a whole or may even be used on a subscription-services model in which individual airlines may utilize the system. In a subscription-services model, each airline may also be granted access to confer with data of other airlines to promote an efficient departure schedule that would not clash with intended departures of another airline, in particular when multiple airlines are disposed in an airport or terminal.

The airport monitoring system may enable exception reporting which alerts users whether a problem exists relating to the surface management. When additional data relating to the problem is requested, the airport monitoring system may provide a variety of additional data. For example, a list of aircraft in question may be provided. In another example, a flight rack may be provided which indicates whether an aircraft is still on the ground, in the terminal airspace, in an en route structure, etc. In a further example, an analysis may be provided which allows a user to immediately compare an event (i.e., the problem) with other data sets (e.g., previously encountered problems) which allow for a more informed decision on generating the departure schedule. In yet another example, recommendations may be provided which gives a user recommended solutions to resolve key performance indicator (KPI) problems such as alleviating stranded aircraft.

The recommendations may use a collaborative decision making protocol which includes elements from existing solutions from conventional systems.

Further detail relating to the above described elements of the airport monitoring system will be discussed. The airport monitoring system may be embodied in a web based application. In a first exemplary embodiment, the airport monitoring system may be an independent application that is executed off any of the servers of the airport 100, a server of a separate network, etc. In a second exemplary embodiment, the airport monitoring system may be incorporated with existing systems of the airport 100.

The airport monitoring system may include a KPI dashboard. The KPI dashboard may be configured to track critical KPIs using clear visual indicators and/or alerts of performance of each. For example, the KPIs may include a ground status alert, an airport performance and a terminal airspace performance. The alerts for the ground status may include a block-out to off metric, an on to block-in metric, a departure queue delays segmented by departure fix, stranded aircraft indicators including access to and integration of conventional monitoring system modules, and deicing status. The alerts for airport performance may include runway configuration, arrival/departure rates, and delay minutes. The alerts for terminal airspace performance may include departure fix status/performance, airport efficiency score (e.g., aircraft spacing calculation), arrival airspace efficiency score (e.g., speed and flying distance calculations), arrival/departure traffic management initiatives (TMI) performance alert (e.g., actual versus advertised miles in trail), and terminal area hold alert.

As discussed above, the airport monitoring system may be configured to provide suggestions and/or recommendations for the surface management of the airport 100. To provide the surface management data as well as the suggestions/recommendations, the airport monitoring system may calculate a variety of metrics. For example, taxi times may be estimated. For departure times, current average times may be measured from block-out to off over a specified period of time that may be selected by the user. For arrival times, current average time may be measured from on to block-in over a specified period of time that may also be selected by the user.

In another example, estimated departure/arrival times may be estimated. Using current average taxi-to-takeoff time for departures and taxi time for arrivals, an ETD/ETA may be estimated. Further examples of calculated metrics may include mile in trail performance (e.g., advertised versus actual departure in-trail), fix performances (e.g., rates through fixes), and stranded aircraft (e.g., flights that have blocked-out but are not off or are on but not blocked-in).

Also as discussed above, the airport monitoring system may provide tracks, for example, as an aircraft visualization on the ground and airborne. Aircraft may be viewable on a display associated with the airport monitoring system of the present invention or on a system which integrates the airport monitoring system of the present invention. This data may be adjusted in real time over the area covered by a ground surveillance radar disposed in the airport. A user may be allowed to zoom in and out of coverage areas to be able to generate a broad and narrow image of ground movement areas. The airport monitoring system of the present invention may be equipped to pan and zoom movement as intuitive and easily manipulated actions using advanced interfaces for mapping programs. An aircraft tag for tracking purposes may include a variety of information such as, but not limited to, the following: airline/flight number, destination, origin, first departure fix, tail number, aircraft type, actual elapsed time off the gate, scheduled time of departure, planned time of departure, estimated time of departure, and ability to display flight plan fixes. A filtering option may be used so that at least some of the tags for the aircrafts may be included or excluded on the preference of the user. The airport monitoring system may also provide a detailed airport map with high-resolution including, for example, location of central deice pads. To facilitate easier reading of the tracking of aircrafts, color coding by departure fix and airline may be used. The tracking may also use segmentation of ground queues by departure fix to show users the association of each group departure queue to the specific fix.

The airport monitoring may provide a variety of onscreen lists. In a first example, a current actual queue or order in which aircraft are listed for departure using a preset point on the airport movement areas may be shown. Color coding aircraft to reflect different time thresholds may be introduced into the queue. In a second example, departure by airline and flights by origin/destination may be shown. The departure schedule may also be shown in which a user is able to see each aircraft in a list, sortable by different variables (e.g., ETD, scheduled time of departure, OFF blocks, destination city, airline, flight number, etc.) which may be based on a departure fix or gate. Departure sequencing filters may be introduced to allow a user to select to see as a list only those flights associated with a particular parameter (e.g., departure gate). The list may also include an amount of time already spent in the queue as well as a delay factor that is presently existing at the time of the departure schedule was generated. In addition, an extended hold-out factor may be shown which relates to stranded aircraft.

The aircraft monitoring system may generate statistics and reports. These statistics/reports may include metrics such as OUT to OFF, ON to IN, departure fix performance, flight delays, miles-in-trail (advertised versus actual), runway configuration, arrival/departure rates, etc.

As discussed above, the airport monitoring system may also generate recommendations and/or suggestions. Using the data discussed above, the airport monitoring system may be equipped with an intelligence protocol that is capable of determining a variety of recommendations in order to improve surface management and resolve issues for departure schedules and stranded aircraft. For example, the recommendations may include flight plan revisions such as recommended new coded departure routes. In another example, an optimal runway configuration may be given. In yet another example, a push back sequence may be recommended based on the activity of airborne traffic, departure restrictions, average taxi-to-takeoff times, whether an estimate departure control time is in effect, etc. Also as discussed above, a collaborative decision making protocol may be used with an existing system to enable easy interaction within and between airlines/airport personnel. To facilitate the collaborative decision making protocol, the airport monitoring system may be configured to provide instant chat/messaging screens, a stranded aircraft email alert system, integration of existing system pages, etc.

Figure 2:
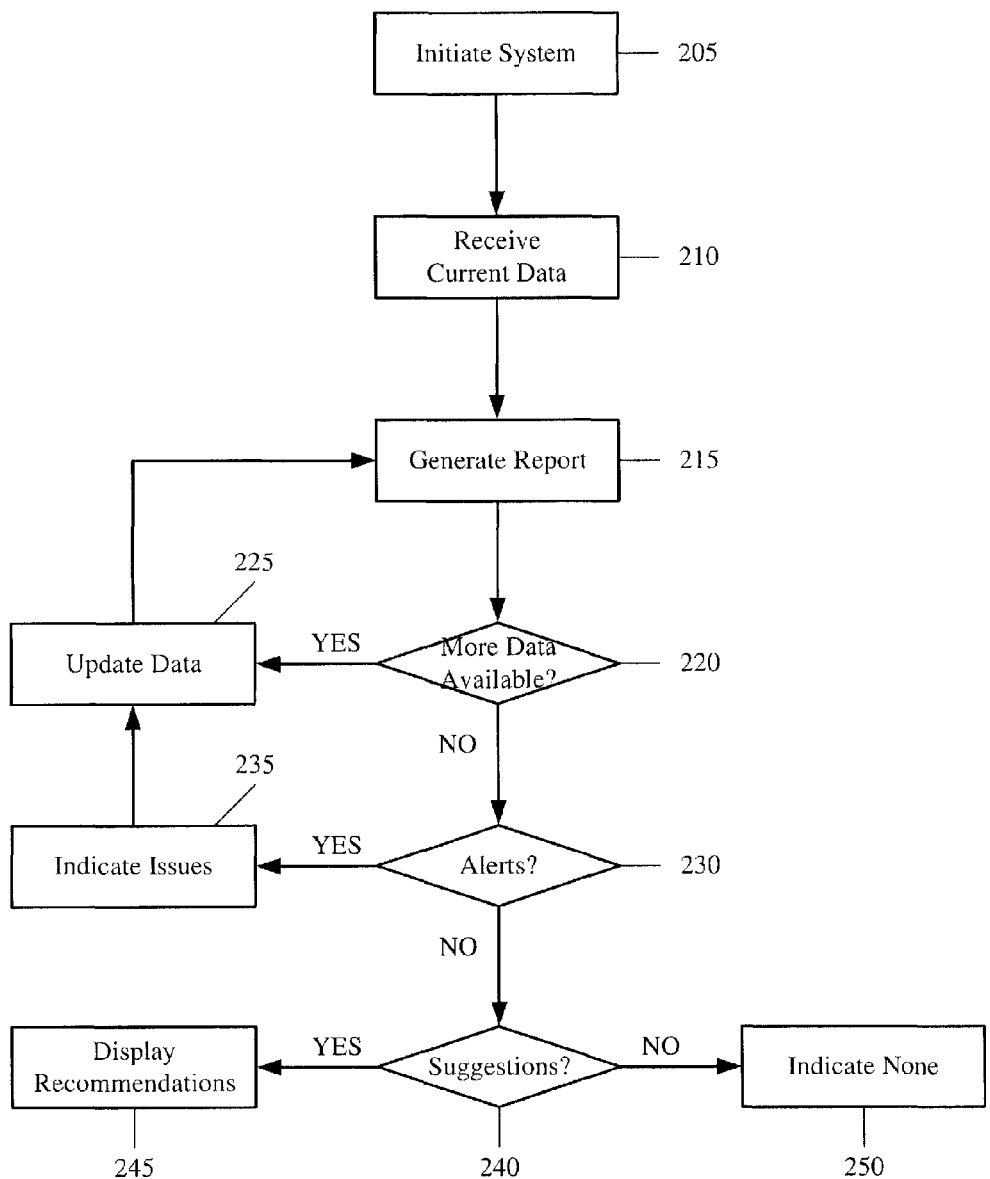
FIG. 2 shows a method for providing data relating to surface management according to an exemplary embodiment of the present invention.

FIG. 2 shows a method 200 for providing data relating to surface management according to an exemplary embodiment of the present invention. The method 200 will be discussed with reference to the airport 100 of FIG. 1. The method 200 may be used by the central server 125, for example, when the airport management system is centralized. The method 200 may also be used by the remote servers 135, 145, 155, 165, for example, when the airport management system is subscription-based.

In step 205, the airport management system is initiated. As discussed above, the airport management system may be embodied in a variety of different protocols. For example, the airport management system may be web-based. In this example, a user may open a web browser to open a web page that hosts the airport management system. Whether the system is centralized or subscription-based, a user may be requested to authenticate an identity to access the system. In another example, the airport management system may be a program executed on a processor of the server. In this example, a user may simply initiate the program at which the system is activated.

In step 210, current surface management data is received by the airport management system. The surface management data may be retrieved from a variety of sources. For example, data may be accumulated in the central database 130. Thus, when the system is activated, the data stored in the central database 130 may be retrieved by the central server 125 or the remote servers 135, 145, 155, 165. In another example, the data may be retrieved from the remote databases 140, 150, 160, 170.

In step 215, a report is generated using the current surface management data. As discussed above, the report may include a plurality of different types of data. Also as discussed above, the report may be filtered to include selected data among the plurality or include additional types that the user has optioned to include in the report. The report may be generated to include the key performance metrics that affect surface management. Furthermore, the report may organize the key performance metrics so that a user may readily recognize the important points needed for efficient surface management. For example, a first key performance metric that is shown is a grounded time that indicates how long an aircraft has been ready for take-off but remains grounded. That is, the report may be organized to focus on decision support to determine the most efficient course of action to improve surface management.

In step 220, a determination is made whether more data is available. The server that is executing the airport management system may query the other servers to indicate whether the further data is available. If more data is available, the method 200 continues to step 225 where the surface management data is updated. The method 200 may return to step 215 where the report is generated incorporating the additional data.

If no more additional data is available, the method 200 continues to step 230 where a determination is made whether alerts exist. As discussed above, the airport management system may be configured to determine whether issues exist within the report that is generated which may affect surface management. If alerts exist, the method 200 continues to step 235 where the issues are indicated. The indication of the issues may be performed in a variety of ways. As discussed above, the issues may be highlighted with color coding. Further examples include a superimposed indication, sound alarms, etc. The method may return to step 225 to update the data with the issues being indicated and the report may be generated in step 215.

If no alerts exist, the method 200 continues to step 240 where the airport management system determines if suggestions and/or recommendations are determined in view of the report that was generated with the most current surface management data. As discussed above, the airport management system may automatically determine the recommendations based on a variety of sources including metric comparisons, comparisons to other databases (e.g., existing airport management systems), least cost analysis, etc. If recommendations are found, the method 200 continues to step 245 where the recommendations are displayed. In a specific example, the recommendation may be the departure schedule that allows the most efficient surface management given the most current surface management data. If no recommendations are found, the method 200 continues to step 250 where it is indicated that none were determined.

The exemplary embodiments of the present invention may be used to allow a more efficient surface management control at an airport that focuses on reduction of costs and dissatisfaction from delays. Through the airport management system of the present invention, TMIs in the terminal airspace may be prevented or optimized, especially ground delay programs (GDPs). Costs may be reduced by optimizing fuel use and managing diversions as less time is spent between OUT-to-OFF. Connection management may be optimized as more accurate estimated times of arrival may be calculated as well as arrival gate management being optimized from the more accurate estimated times of arrival.

Additionally, the exemplary embodiments of the present invention enable a new set of critical business metrics and/or decisions to be managed with a focus on departure management. For example, block time may be optimized which results in the most efficient OUT-to-OFF as fuel burn is reduced and greater schedule reliability. In another example, ground congestion is managed with greater awareness and control over extended hold-outs and/or stranded aircraft which also results in reduced fuel burn as well as superior passenger care.

Those skilled in the art will understand that the above described exemplary embodiments may be implemented in any number of manners, including as a separate software module, as a combination of hardware and software, etc. For example, the airport monitoring system may be a program containing lines of code that, when compiled, may be executed on a processor. Specifically, the airport monitoring system may be a program of a server for a network in which data relating to surface management is stored in a database of the network.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. An airport management system, comprising:
   a memory storing surface management data for a plurality of aircraft on an airport surface;
   a processor calculating a metric using the surface management data of each of the plurality of aircraft and generating a recommendation for the plurality of aircraft based on the calculated metric, wherein the recommendation includes a generated departure schedule based on the surface management data of each of the plurality of aircraft; and
   a display displaying aircraft location at the airport including an identification of the aircraft, wherein the display further displays selected surface management data for each of the aircraft.

2. The airport management system of claim 1, wherein the processor further generates alerts based on the surface management data of each of the plurality of aircraft.

3. The airport management system of claim 1, wherein the surface management data includes one of a block-out time, a block-in time, an off time, an on time, and a deicing time.

4. The airport management system of claim 1, wherein the metric is one of an estimated taxi time, an estimated departure time, an estimated arrival time, a miles in trail performance, and a fix performance.

5. The airport management system of claim 1, wherein the recommendation includes a selection of a coded departure route for one of the aircraft.

6. The aircraft management system of claim 1, wherein the location includes a runway, a taxiway and a gate.

7. The airport management system of claim 1, wherein the recommendation includes a push back sequence for the aircraft.

8. A non-transitory computer readable storage medium including a set of instructions executable by a processor, the set of instructions configured to:
   receive surface management data for a plurality of aircraft on an airport surface;
   calculate a metric using the surface management data of each of the plurality of aircraft; generate a recommendation for the plurality of aircraft based on the calculated metric,
   wherein the recommendation includes a generated departure schedule based on the surface management data of each of the plurality of aircraft; and
   display aircraft location at the airport including an identification of the aircraft, wherein the display includes selected surface management data for each of the aircraft.

9. The computer readable storage medium of claim 8, wherein the set of instructions are further configured to generate alerts based on the surface management data of each of the plurality of aircraft.

10. The computer readable storage medium of claim 8, wherein the surface management data includes one of a block-out time, a block-in time, an off time, an on time, and a deicing time.

11. The computer readable storage medium of claim 8, wherein the metric is one of an estimated taxi time, an estimated departure time, an estimated arrival time, a miles in trail performance, and a fix performance.

12. The computer readable storage medium of claim 8, wherein the recommendation includes a selection of a coded departure route for one of the aircraft.

13. The computer readable storage medium of claim 8, wherein the location includes a runway, a taxiway and a gate.

14. The computer readable storage medium of claim 8, wherein the recommendation includes a push back sequence for the aircraft.

* * * * *